(12) United States Patent
Passant

(10) Patent No.: US 7,043,323 B2
(45) Date of Patent: *May 9, 2006

(54) GLASS PROCESSING EQUIPMENT WITH DYNAMIC CONTINUOUS PRODUCTION CONTROL SYSTEM

(75) Inventor: Johannes F. Passant, Natrona Heights, PA (US)

(73) Assignee: Billco Manufacturing, Incorporated, Zelienople, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,241

(22) Filed: Apr. 11, 2005

(65) Prior Publication Data

US 2005/0182506 A1    Aug. 18, 2005

Related U.S. Application Data

(63) Continuation of application No. 10/410,877, filed on Apr. 10, 2003, now Pat. No. 6,879,873.

(60) Provisional application No. 60/319,178, filed on Apr. 10, 2002.

(51) Int. Cl.
*G06F 19/00* (2006.01)
(52) U.S. Cl. .................. 700/101; 700/167; 700/171; 83/13; 83/75.5
(58) Field of Classification Search ............ 700/171, 700/167, 101; 83/75.5, 13
See application file for complete search history.

(56) References Cited

U.S. PATENT DOCUMENTS

| | | | |
|---|---|---|---|
| 4,709,483 A | 12/1987 | Hembree et al. | |
| 5,341,306 A | 8/1994 | Fujita et al. | |
| 5,757,647 A | 5/1998 | DeMichele | |
| 5,791,971 A | 8/1998 | Dickinson et al. | |
| 5,832,801 A | 11/1998 | Bando | |
| 6,349,241 B1 | 2/2002 | Peron et al. | |
| 6,463,762 B1 | 10/2002 | Ross, Jr. | |
| 6,810,784 B1 | 11/2004 | Cunnigham | |
| 6,879,873 B1 * | 4/2005 | Passant | 700/171 |

OTHER PUBLICATIONS

Fenevision Production Control Brochure; © 2002–2003 Fenetech, Inc.; www.fenetech.com/products/prodctrl.htm.

* cited by examiner

*Primary Examiner*—Leo Picard
*Assistant Examiner*—Steven R. Garland
(74) *Attorney, Agent, or Firm*—Blynn L. Shideler; Krisanne Shideler; BLK Law Group

(57) ABSTRACT

A glass product cutting line includes a CNC cutting table, a sheet feeding device for feeding glass sheets to the glass cutting table, a plurality of harp racks, a sorting device and a dynamic cutting line control system. The control system optimizes the work piece layout on the individual sheets with a biasing favoring individual work pieces assigned to a leading harp rack. The bias tends to cut work pieces of the leading harp rack on leading sheets fill the leading harp rack in a minimum time. The system allows for removal of a filled leading harp rack, by designating a new leading harp rack for the control system, which then dynamically adjusts the bias and associated cutting scheduling.

20 Claims, 3 Drawing Sheets

Schedule 335, run 203      14
Glass : Gyds 130x96
Yield : 92.7 (92.7)

```
┌─────────────────────────────────────────────────┐
│ A 1.55     │              │ 19 3/8   A 1.53     │ 16
│            │   A 1.75     │              71 15/16│
│            │              ├─────────────────────┤
│            │   52 5/8     │ 19 3/8   A 1.51     │ 16
│            │       16     │              71 15/16│
│            │              ├─────────────────────┤
│     16     │              │         A 1.49      │ 16
│            │     36 3/4   │ 19 3/8       71 15/16│
│ 71 15/16   ├──────────────┴──────┬──────────────┤
│            │ A 1.81  │ A 1.79    │ A 1.77       │
│            │ 36 3/4  │ 36 3/4    │ 36 3/4       │
│            │   16    │   16      │   16         │
│  19 3/8    │ 36 7/8  │ 36 7/8    │ 36 7/8       │
└─────────────────────────────────────────────────┘
```

| Label | Seq. | Order | Rack/Atrm | Hor. x Ver. | Shape |
|-------|------|-------|-----------|-------------|-------|
| A 1.77 | 1 | 791800.001 | A 1.77 | 36 3/4 x 36 7/8 | - |
| A 1.78 | 2 | 791800.001 | A 1.78 | 36 3/4 x 36 7/8 | - |
| A 1.81 | 3 | 791800.001 | A 1.81 | 36 3/4 x 36 7/8 | - |
| A 1.49 | 4 | 791800.001 | A 1.49 | 19 3/8 x 71 15/16 | - |
| A 1.51 | 5 | 791800.001 | A 1.51 | 19 3/8 x 71 15/16 | - |
| A 1.53 | 6 | 791800.001 | A 1.53 | 19 3/8 x 71 15/16 | - |
| A 1.75 | 7 | 791800.001 | A 1.75 | 36 3/4 x 52 5/8 | - |
| A 1.55 | 8 | 791800.001 | A 1.55 | 19 3/8 x 71 15/16 | - |

Figure 2

GLASS PROCESSING EQUIPMENT WITH DYNAMIC CONTINUOUS PRODUCTION CONTROL SYSTEM

CROSS REFERENCE TO RELATED APPLICATIONS

The present application is a continuation of U.S. patent application Ser. No. 10/410,877 filed Apr. 10, 2003, entitled "CNC GLASS CUTTING LINE WITH DYNAMIC CONTINUOUS PRODUCTION CONTROL SYSTEM" which published as U.S. Published Patent Application No. 2003/0226433 and is now U.S. Pat. No. 6,879,873. U.S. patent application Ser. No. 10/410,877 claims the benefit of U.S. Provisional Patent Application Ser. No. 60/319,178, filed on Apr. 10, 2002 and entitled "CNC GLASS CUTTING LINE WITH DYNAMIC CONTINUOUS PRODUCTION CONTROL SYSTEM". The above cited patents and published patent applications are incorporated herein by reference in their entirety.

BACKGROUND OF THE INVENTION

1. Field of the Invention

The present invention relates to CNC controlled machines with continuous production control. Specifically, the invention relates to a CNC controlled glass cutting line including a glass table with a dynamic, continuous production control system.

2. Background Information

Glass cutting lines, including glass cutting tables, are well-known in the art, such as those sold by the assignee of the present invention, Billco Manufacturing, Inc. The central piece of equipment in the glass cutting line is the glass cutting table, examples of which are described in U.S. Pat. Nos. 5,791,971, 6,463,762 and 6,810,784, which are incorporated herein by reference. The glass cutting table is designed to cut generally rectangular glass sheets into a plurality of individual glass work pieces for subsequent manufacturing. The typical glass cutting line will also include a sheet feeding device upstream of the glass cutting table for feeding the glass sheets to be cut to the glass cutting table. The sheet feeding device may be in the form of an air float table to which individual glass sheets to be cut are fed, such as from a storage rack, and then aligned prior to forwarding to the glass cutting table. The typical glass cutting line will also include a sorting device downstream of the glass cutting table where the cut glass sheets are individually sorted by the specific glass work pieces into storage racks, generally called harp racks. A harp rack is provided with a number of slots, such as 100, for receiving the individual cut glass work pieces. The sorting device may be formed as an air float table with a plurality of adjacent harp racks.

Existing glass cutting lines typically utilize a production control system designed to minimize scrap. Currently, a specific cutting schedule for a production run, or single batch, is prepared in advance by the control system. The production run essentially corresponds to the number of harp racks and associated slots at the sorting station. Basically, existing optimization programs are used to determine the optimal cutting schedule for filling the slots of the harp racks with the desired glass work pieces. The cutting schedule essentially refers to the collection of layouts of the individual glass work pieces on all the glass sheets to be cut for the production run or batch. Following the production run, the filled harp racks can be moved to the next location in the manufacturing process. It is important to note that different harp racks may go to different assembly lines and, therefore, may have widely different product mixes, i.e., a different set of individual glass work pieces filling the different harp racks. At the end of the production run is the last sheet, which generally has the lowest yield (i.e., the highest scrap) because the glass work pieces formed from this "last sheet" do not fill up the sheet. Additionally, some control systems allow for re-cuts to be added to the last sheet to help minimize the yield loss of the entire production cycle. Re-cuts are duplicate work pieces to replace previous cut work pieces that may have been damaged, broken or otherwise unusable.

The existing systems are limited by several problems. First, each system is limited by the number of available slots in the available harp racks. In general, the greater the number of slots the greater the yield since the optimizing program will have a greater number of pieces to select from to maximize product yield. Second, the harp racks generally cannot be moved until the entire production run is completed, including the re-cuts at the end of the batch process. Third, the existing last sheet problem increases yield loss, even with re-cuts incorporated into the last sheet. Additionally, the existing system does not easily accommodate special pieces not accounted for in the production run. It is one object of the present invention to overcome these problems of the prior art optimization systems and provide an efficient, effective glass cutting line with dynamic production control.

SUMMARY OF THE INVENTION

The above problems with the prior art are addressed with a glass product cutting line having a CNC cutting table, a sheet feeding device, a plurality of harp racks, a sorting device and a dynamic cutting line control system according to the present invention. The CNC or computer controlled glass cutting table is for cutting sheets of glass into cut glass work pieces. The feeding device is for feeding glass sheets to the glass cutting table and the sorting device is for sorting the cut glass work pieces and moving the cut glass work pieces to the associated harp rack. Each harp rack will generally have a plurality of slots receiving the cut glass work pieces. The dynamic cutting line control system includes an optimizer coupled to the controller of the glass cutting table optimizing the glass work piece layout on the individual sheets of glass. The optimizer includes a dynamically adjustable bias or biasing feature for favoring individual cut glass work pieces assigned to a leading harp rack, whereby the bias will tend to position and cut the glass work pieces assigned to the leading harp rack on leading sheets to completely fill the leading harp rack in a minimum time. The control system further accommodates removal of a filled leading harp rack from the glass cutting line. This is aspect of the control system is collectively called a rack removal accommodator with the accommodator designating a new leading harp rack for the optimizer, which then dynamically adjusts the bias and associated cutting scheduling.

The accommodator of the control system may introduce a new empty harp rack to replace the previous filled leading harp rack that has been removed. The control system may further include an input mechanism for inputting additional glass work pieces to be cut into the optimizer. The input mechanism may accommodate re-cuts of previously cut glass work pieces. The re-cuts inputted may include a designation of the desired harp rack. The input mechanism may accommodate special glass work pieces that are not assigned to a given harp rack. The special work pieces may be provided with a bias by the optimizer higher than the bias for the work pieces assigned to the leading harp rack. A rare harp rack with minimal slots may also be provided for assigning and holding work pieces that very uncommon (i.e. rare).

The bias is generally in the form of an adjustable weighting factor for each harp rack, wherein the biasing or weighting factor is the greatest for the leading harp rack and wherein the biasing factor for each harp rack is increased as the harp rack is closer to being filled. However the bias may be any function or method of making the work pieces for the leading harp rack more likely to be completed before the remaining work pieces, without, of course, an absolute requirement for the leading rack to be completed first.

The apparatus of the present invention provides a method of dynamically controlling a glass product cutting line having a computer controlled glass cutting table cutting sheets of glass into cut glass work pieces and a plurality of cut glass work piece holding harp racks. The method comprising the steps of optimizing the glass work piece layout on the individual sheets of glass, wherein the optimizing includes a biasing for favoring individual cut glass work pieces assigned to a leading harp rack, whereby the biasing will tend position and cut the glass work pieces assigned to the leading harp rack on leading sheets to completely fill the leading harp rack in a minimum time; removing a leading harp rack from the glass cutting line when filled; and designating a new leading harp rack for the cutting table for dynamically adjusting the bias and subsequent cutting scheduling. The method may further include the steps of adding a new empty harp rack to replace the previous filled leading harp rack that has been removed, and imputing additional glass work pieces to be cut. The inputting may accommodate re-cuts of previously cut glass work pieces, wherein the re-cuts include a designation of the desired harp rack. The inputting may further accommodate special glass work pieces that are not assigned to a given holding rack or assigned to a rare holding rack. The special work pieces may be provided with a bias higher than the bias for the work pieces assigned to the leading harp rack.

These and other advantages of the present invention will be clarified in the description of the preferred embodiment taken together with the attached figures wherein like reference numerals represent like elements throughout.

BRIEF DESCRIPTION OF THE DRAWINGS

FIG. 2 is a schematic view of an input screen for the production control system of the present invention illustrating a proposed sheet layout;

DETAILED DESCRIPTION OF THE PREFERRED EMBODIMENT

Figure 1:
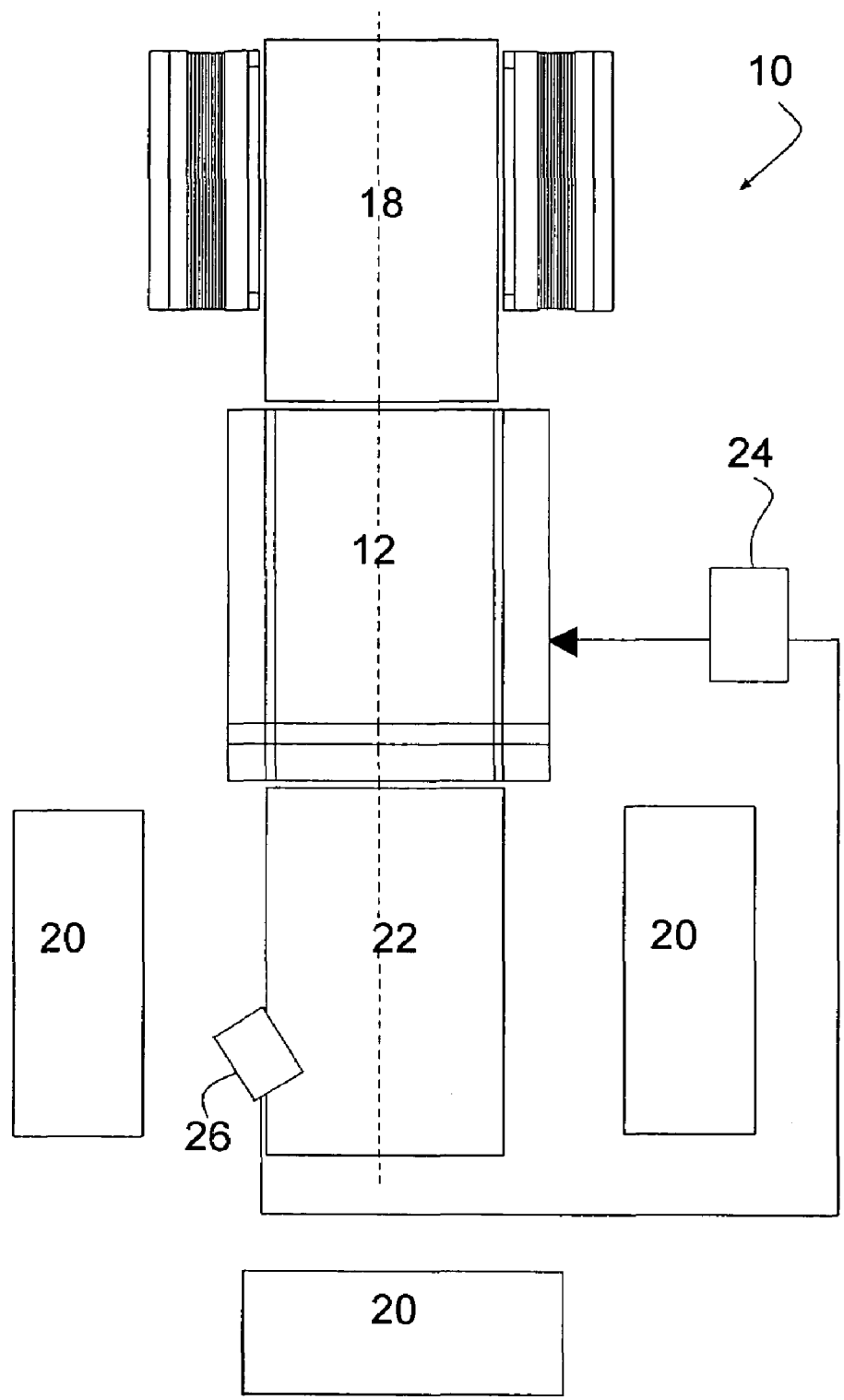
FIG. 1 is a schematic plan view of a glass cutting line using a dynamic continuous production control system according to the present invention.

FIG. 1 schematically illustrates a glass product cutting line 10 according to the present invention. The central component of the cutting line 10 is a computer controlled of CNC glass cutting table 12 for cutting sheets of glass 14 into cut glass work pieces 16. The cutting table 12 is well known in the art such as those sold by Billco Manufacturing, Inc. The table 12 generally includes a cutting or scoring head mounted on a carriage which, in turn, is mounted on a bridge over the table surface. The carriage and bridge from an X-Y positioning system for the cutting head.

A feeding device 18 is provided upstream of the table 12 for feeding glass sheets 14 to the glass cutting table 12. The feeding device 18 may include an air float table, such as manufactured by Billco Manufacturing Inc. Additionally the feeding device 18 may include an alignment mechanism for properly positioning the glass sheets 14 on the table 12. The feeding device 18 may include manual input for loading and positioning the sheets 14 on the cutting table 12 or the feeding may be automated. A plurality of moveable, cut glass work piece 16 holding, harp racks 20 are positioned downstream of the table 12, with each harp rack 20 having a plurality of slots receiving the cut glass work pieces 16.

A sorting device 22 is downstream of the table 12 for sorting the cut glass work pieces 16 and moving the cut glass work pieces 16 to the associated harp rack 20. The harp racks 20 are positioned adjacent the sorting device 22. The sorting device 22 may include an air float table similar to the feeding device 18. As with the feeding device 18, the sorting device 22 may utilize manual input for loading and positioning the work pieces 16 from the float table to the designated slots of the harp rack 20 or the loading may be automated.

The key feature of the cutting line 10 of the present invention is a dynamic cutting line control system 24 including an optimizer coupled to the controller of the glass cutting table 12. The optimizer will optimize the layout of the glass work pieces 16 on the individual sheets of glass 14. A representative example of this optimization is illustrated in the schematic layout for "Sheet 1" on the touch screen input device display shown in FIG. 2. The general operation of an optimizer is believed to be known to those in the art. The most significant feature of the present invention is the inclusion of an adjustable weighting or biasing for favoring individual cut glass work pieces 16 assigned to a leading harp rack 20, whereby the bias will tend to position and cut the glass work pieces 16 assigned to the leading harp rack 20 on leading sheets 14 to completely fill the leading harp rack 20 in a minimum time.

The optimizer of the present invention will still take into account all of the slots currently available in all of the harp racks 20 in optimizing the layout of the incoming sheet 14. The optimizer simply weights, or favors, the work pieces 16 for the leading harp rack 20 to a greater extent. The weighting results in a filling of the leading harp rack 20 first, allowing the filled harp rack 20 to be removed from the cutting line 10 and sent for subsequent processing. It will be understood that the bias will change the layout that may otherwise be generated for the given sheet 14 and this might actually be a lower yield arrangement. However it is expected that this loss will be offset and the total yield loss may actually decrease by the avoidance of a last sheet, as will be described below. The improvement is the ability to move the filled rack 20 (the leading rack) to subsequent processing to avoid delays in subsequent processing. Essentially the cutting line 10 is no longer a batch process, but a dynamic, continuous process. The biasing or weighting described for the present invention can be accomplished in any number of ways as will be appreciated by those in the art. For examples, negative weights may be added to the work pieces 16 assigned to the non-leading racks 20, effectively positively weighting the work pieces 16 assigned to the leading rack 20. The bias within the meaning of the present invention will be any system or method which makes it more likely that the work pieces 16 assigned to the leading racks 20 are processed or cut first. It is not expected that the cutting of the work pieces 16 assigned to the leading rack 20 be an absolute requirement.

The removal of a filled leading harp rack 20 from the glass cutting line 10 allows the control system 24 to designate a new leading harp rack 20 for the optimizer which dynamically adjusts the bias and associated cutting scheduling. This feature of the control system 24 is collectively called a harp rack removal accommodator. The accommodator will reprioritize the remaining harp racks 20 and allow for the inclusion of a new harp rack 20 replacing the filled harp rack 20 that was removed. The reprioritization is simply assigning, or reassigning, a weighting or bias value to the specific harp racks. The next harp rack 20 to be removed will be the new leading harp rack 20 and will generally have the highest biasing or weighting factor. The bias referred can be associated with the harp racks 20 to which the work pieces 16 are assigned or can alternatively be considered to be associated directly with the work pieces 16.

The adding of replacement harp racks 20 is another key feature of the present invention which will advantageously affect total yield. This feature allows the cutting line to operate with any number of harp racks 20 regardless of the number of harp racks 20 that may be located around the sorting device 22. As a simplistic illustrative example consider the cutting line 10 forming four separate product mixes for specific harp racks 20, referred to as rack mix A, B, C, and D respectively. It will be obvious that the traditional batch process of the prior art will require at least two separate production runs to be planned. Further complicating the matter may be that the racks may not be equally needed in subsequent processing lines (e.g. consider a distribution of 50% A, 30% B, 15% C and 5% D). This would further increase the number of separate batch runs (each with a separate last sheet) needed to accommodate the desired production with the prior art. The present cutting line 10 easily accommodated the product mixes by continuously adding harp racks 20 to the queue. The cutting line 10 thereby accommodated a greater number of harp rack types than can fit around the sorting device 22 and also easily accommodates a varying percentage of the distinct harp racks 20.

The present control system 24 relies on the ability of the optimizer to dynamically optimize subsequent sheets in a manner similar to the existing optimizing of last sheets with added re-cuts. The difference is the optimization of each sheet 14 individually taking into account all of the available slots in the harp racks 20 currently adjacent the sorting device 22 and taking into account the bias for the leading harp rack 20. The bias for the leading harp rack 20 may be adjustable by the operator allowing for the operator to balance the overall yield obtained with the desire to decrease the time in filling the leading harp rack 20. A further feature of the present invention is that the bias or weighting factor used for each harp rack 20 or each piece 16 may also change as the harp rack 20 is closer to being filled. In other words the relative weighting factors for each harp rack 20 may also change as the harp rack 20 is filling up with work pieces 16 with the bias increasing as the harp rack 20 is closer to being filled. This relative increase or weighting in favor of almost filled harp racks 20 may be adjustable by the user so the operator can adjust the weighting increase and overall weighting values to balance yield and harp rack 20 filling rates.

The current system is continuous, or at least a semi-batch process, and avoids the last sheet problem of the prior art. Further the control system 24 avoids much of the problem with re-cuts. When a re-cut is desired, the operator can simply input the desired re-cut and it will be automatically entered into the product mix with the desired weighting associated. For example if the leading harp rack 20 is almost filled and a re-cut is needed to complete the harp rack, the operator inputs the desired re-cut and the above described weighting procedure would prioritize this work piece 16. The leading harp rack 20 will be completed without waiting till the end of a production run as in the prior art. The input may be through an input device such as a touch screen 26 illustrated in FIG. 2. The operator merely touches on the image of the desired work piece 16 illustrated on the appropriate sheet 14 and a new screen allowing the entry of a re-cut request is shown to the operator. The system also accommodates special pieces not in the original product mix (e.g. products not normally produced on this cutting line). The special pieces may not be associated with any harp rack and would likely be given the highest weighting. Alternatively a rare rack 20 with minimal slots may be positioned adjacent the sorting device 22 to accommodate and hold rare work pieces 16 such as a special piece. The weighting of work pieces 16 assigned to such a rare rack 20 can be left to the operator. It is important to note that the highest weighting will not guarantee the subject piece is cut on the next sheet 14 it simply makes it more likely. In other words even with the priority weighting, work pieces from non-leading harp racks 20 may be determined to be optimal.

Figure 3:
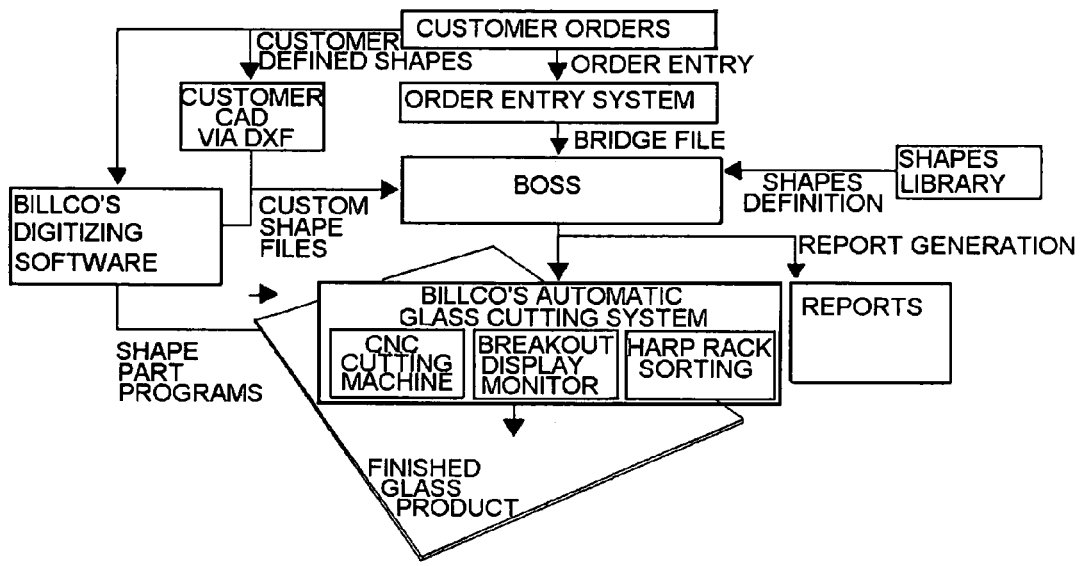
FIG. 3 is a schematic flow chart of an automated glass cutting process incorporating the dynamic continuous production control system according to the present invention.
Figure 4:
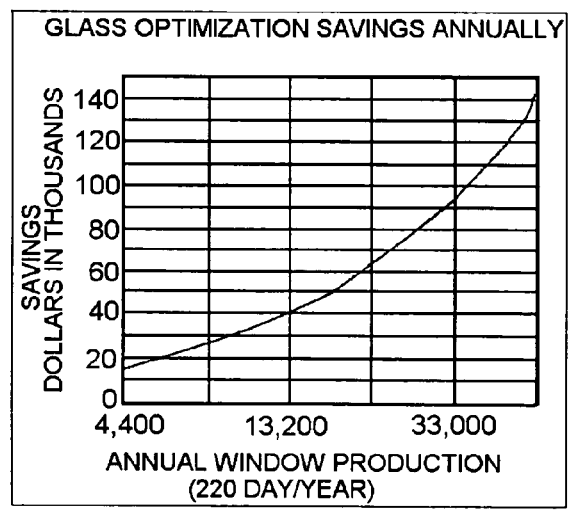
FIG. 4 is a graph illustrating a representative example of annual savings through implementation of the dynamic continuous production control system according to the present invention.

Regarding the use of the present invention, FIG. 3 is a schematic flow chart of an automated glass cutting process incorporating the dynamic continuous production control system according to the present invention as described above. The use of the present invention can provide significant improves savings over prior art systems. FIG. 4 is a graph illustrating a representative example of annual savings through implementation of the dynamic continuous production control system according to the present invention.

The control system of the present invention may be retrofitted to operate on cutting lines of the prior art. The other advantage of the present invention will be apparent to those in the art. The invention has been described with reference to the preferred embodiment. Obvious modifications and alterations will occur to others upon reading and understanding the proceeding detailed description. It is intended that the invention be construed as including all such modifications and alterations. The scope and content of the present invention is defined by the appended claims and equivalents thereto.

What is claimed is:

1. A dynamic product control system in a glass work piece manufacturing plant for a product production line having a plurality of processed work piece holding positions, in which glass work piece product is processed into individual processed work pieces that are moved to individual holding positions, the control system comprising:
   an optimizer coupled to the product production line optimizing the work piece scheduling, wherein the optimizer includes a biasing for favoring individual work pieces assigned to at least one leading holding position, whereby the bias will tend to schedule and process the work pieces assigned to the at least one leading holding position to completely fill the at least one leading holding position in a minimum time; and a leading holding position removal accommodator coupled to the optimizer, wherein the at least one leading holding position is undesignated as the at least one leading holding position in the glass manufacturing plant product production line and the accommodator designates a new at least one leading holding position for the optimizer.

2. The control system of claim 1, wherein the at least one leading holding position is a plurality of holding positions formed in a moveable holding rack, wherein the accommodator will introduce a new empty holding rack to replace the previous leading positions of a rack that has been removed when filled.

3. The control system of claim 1, wherein the product production line is a glass sheet cutting table and further including an input mechanism for inputting additional work pieces to be cut into the optimizer.

4. The control system of claim 3, wherein the input mechanism accommodates special work pieces that are not assigned to a given holding rack, and re-cuts of previously processed glass work pieces.

5. The control system of claim 1, wherein leading holding positions are formed from a plurality of holding positions formed in a moveable holding rack, wherein the bias is in the form of a weighting factor for each holding rack, wherein the weighting factor for each holding rack is increased as the holding rack is closer to being filled.

6. The control system of claim 1, wherein the production line is a dynamic glass product cutting line having a computer controlled glass cutting table cutting sheets of glass into cut glass work pieces, wherein the optimizer includes a biasing for favoring individual cut glass work pieces assigned to the at least one leading holding position, whereby the bias will tend to position and cut the glass work pieces assigned to the at least one leading holding position on leading sheets to completely fill the at least one leading holding position in a minimum time.

7. The control system of claim 6, wherein the at least one leading holding position is a plurality of holding positions formed in a moveable holding rack, wherein the accommodator will introduce a new empty holding rack to replace the previous leading holding positions of a rack that has been removed when filled, and wherein the bias for each holding rack is increased as the holding rack is closer to being filled.

8. The control system of claim 7, further including an input mechanism for inputting additional glass work pieces to be cut into the optimizer.

9. The control system of claim 8, wherein input mechanism accommodates re-cuts of previously cut glass work pieces, wherein the re-cuts include a designation of a desired rack.

10. The control system of claim 8, wherein the input mechanism accommodates special glass work pieces that are not assigned to a given holding rack, wherein the special work pieces are provided with a bias by the optimizer higher than the bias for the work pieces assigned to the leading holding positions.

11. The control system of claim 10, wherein the bias is in the form of a weighting factor for each rack, wherein the weighting factor is the greatest for the leading holding positions.

12. A glass product cutting line comprising:

a computer controlled glass cutting table for cutting sheets of glass into cut glass work pieces;

a feeding device for feeding glass sheets to the glass cutting table;

a plurality of cut glass work piece holding positions, each position configured to receive at least one cut glass work piece;

a sorting device for sorting the cut glass work pieces and moving the cut glass work pieces to an associated holding position; and a dynamic cutting line control system including an optimizer coupled to a controller of the glass cutting table optimizing a glass work piece layout on the individual sheets of glass, wherein the optimizer includes a biasing for favoring individual cut glass work pieces assigned to at least one leading holding position, whereby the bias will tend to position and cut the glass work pieces assigned to the at least one leading holding position on leading sheets to completely fill the at least one leading holding position in a minimum time, and a leading position removal accommodator coupled to the optimizer, wherein the accommodator designates a new at least one leading position for the optimizer which dynamically adjusts the bias and associated cutting scheduling.

13. The cutting line of claim 12, wherein the at least one leading holding position is a plurality of holding positions formed in a moveable leading holding rack, and wherein the accommodator will introduce a new empty rack to replace a previous leading rack that has been removed when filled.

14. The cutting line of claim 12, further including an input mechanism for inputting additional glass work pieces to be cut into the optimizer, wherein the input mechanism accommodates re-cuts of previously cut glass work pieces, and wherein the re-cuts include a designation of a desired holding position.

15. The cutting line of claim 14 wherein the input mechanism accommodates special glass work pieces that are not assigned to a given holding position, and wherein the special work pieces are provided with a bias by the optimizer higher than the bias for the work pieces assigned to the at least one leading position.

16. The cutting line of claim 12, wherein the bias is in the form of a weighting factor for each holding position, wherein the weighting factor is the greatest for the at least one leading holding position.

17. The cutting line of claim 12, wherein the feeding device and the sorting device each include an air float table.

18. A method of dynamically controlling a glass related product processing line having a computer controlled product processing table that will process glass related products into semi-finished work pieces and a plurality of work piece holding positions, each position receiving at least one work piece, the method comprising the steps of:

optimizing a work piece processing schedule, wherein the optimizing includes a biasing for favoring individual processed work pieces assigned to at least one leading holding position, whereby the biasing will tend to schedule and process the glass related product work pieces assigned to the at least one leading holding position to completely fill the at least one leading holding position in a minimum time; and designating a new at least one leading holding position for dynamically adjusting the bias and subsequent work piece processing scheduling.

19. The method of claim 18, wherein the at least one leading holding position is a plurality of holding positions formed in a moveable leading holding rack.

20. The method of claim 19, further including the steps of adding a new empty rack to replace the previous leading rack that has been removed when filled, and inputting additional work pieces to be processed.

* * * * *